(12) United States Patent
Spackman et al.

(10) Patent No.: US 6,483,775 B1
(45) Date of Patent: Nov. 19, 2002

(54) BIRD COMMUNICATIONS SYSTEM IN A MARINE SEISMIC CABLE

(75) Inventors: James Spackman, Buchanan Dam, TX (US); Mike Maples, Houston, TX (US); John Hepp, Irving, TX (US)

(73) Assignee: Sercel Inc., Houston, TX (US)

( * ) Notice: Subject to any disclaimer, the term of this patent is extended or adjusted under 35 U.S.C. 154(b) by 0 days.

(21) Appl. No.: 09/873,894

(22) Filed: Jun. 4, 2001

(51) Int. Cl.[7] ................................................. G01V 1/38
(52) U.S. Cl. .......................................... 367/19; 367/17
(58) Field of Search .............................. 367/16, 19, 17, 367/154; 114/245

(56) References Cited

U.S. PATENT DOCUMENTS

| | | | |
|---|---|---|---|
| 3,648,642 A | 3/1972 | Fetrow et al. | 114/235 B |
| 3,680,520 A | 8/1972 | Smith | 114/235 B |
| 3,704,681 A | 12/1972 | Campbell et al. | 114/235 B |
| 4,222,340 A | 9/1980 | Cole | 114/245 |
| 4,290,124 A | 9/1981 | Cole | 367/18 |
| 4,611,171 A | 9/1986 | Woods | 324/253 |
| 4,671,120 A | 6/1987 | Fowler | 73/291 |
| 4,709,355 A | 11/1987 | Woods et al. | 367/16 |
| 4,711,194 A | 12/1987 | Fowler | 114/245 |
| 4,912,684 A | 3/1990 | Fowler | 367/76 |
| 5,200,930 A | 4/1993 | Rouquette | 367/76 |
| 5,507,243 A | 4/1996 | Williams, Jr. et al. | 114/245 |
| 5,923,616 A | 7/1999 | Badger et al. | 367/16 |

*Primary Examiner*—Gregory J. Toatley, Jr.
(74) *Attorney, Agent, or Firm*—Browning Bushman P.C.

(57) ABSTRACT

A communication housing for devices external to a solid marine seismic cable, especially for level control devices, comprises an upper housing half and a lower housing half, coupled together around the cable. The upper housing half includes a plurality of wells, for example three wells, each adapted to receive a communication coil. The lower housing half has no such wells. The communication coils are wound in series to reinforce the signal strength of the communication signal. The communication coils are preferably formed to two segments, joined together at a flexible joint to reduce the likelihood of breakage of the coil core as the cable is wound onto a take up reel aboard the exploration vessel.

6 Claims, 2 Drawing Sheets

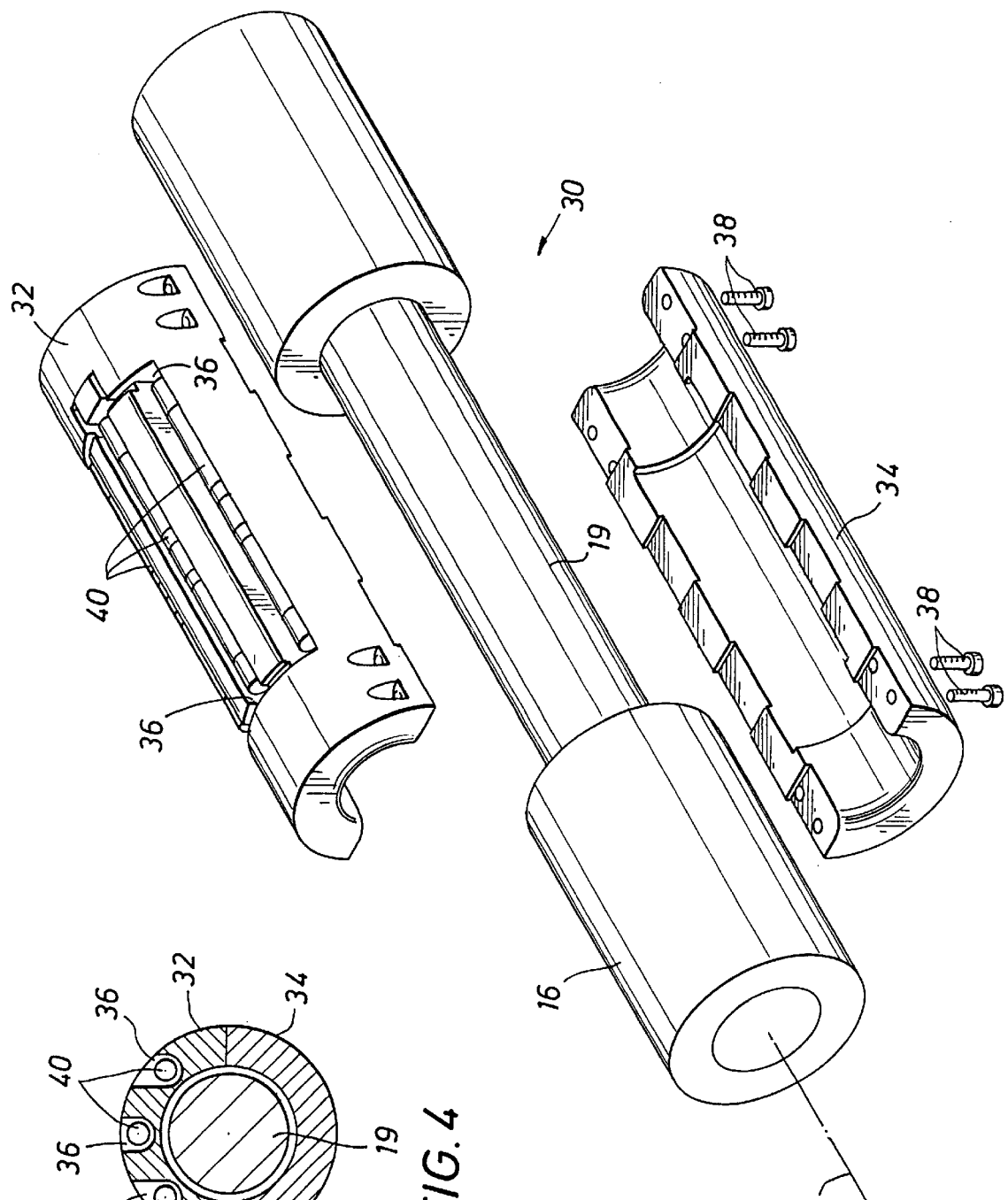

BIRD COMMUNICATIONS SYSTEM IN A MARINE SEISMIC CABLE

FIELD OF THE INVENTION

The present invention relates generally to the field of marine seismic cables, and, more particularly, to a structure and method of communicating with a level control device coupled to the cable, known in the art as a "bird".

BACKGROUND OF THE INVENTION

Solid and semi-solid seismic exploration cables for the marine seismic exploration industry have been in development for some time. Marine seismic cables are central to the acquisition of data for seismic exploration at sea and the development of solid or semi-solid cables has been directed to eliminating the well-known and documented problems associated with fluid filled cables. For example, the fluid in a fluid-filled cable effects the buoyancy of the cable, which is also affected by the temperature and salinity of the water in which the cable towed. Further, oil-filled cables may leak. The outer jacket of a seismic cable of the prior art is prone to rupture or tearing. This is particularly undesirable because this exposes the internal electrical components to seawater, and disrupts the buoyancy of the cable. Thus, a totally solid seismic cable would eliminate such drawbacks of fluid-filled cables.

Depth control devices on the cable, commonly known as birds, are attached to the cable at intervals in order to maintain the cable at a predetermined depth. Such birds are typically attached to the cable through a collar arrangement firmly mounted to the cable. In such systems, communication is coupled through magnetic induction coupling between a communication coil within the fluid in the cable and secondary coils in the bird. However, streamer communications coils are typically constructed with the wiring wound around single ferrite core. Such bulky and fragile devices are not suitable for installation into a solid streamer cable.

Other external devices such as acoustic location modules, compasses, and depth transducers may also use the communication coil for telemetry. This wireless communication system, commonly known in the art, eliminates the need for a physical connection between the communication coil inside the cable and the external device, thus better ensuring water-tight enclosure of the cable. The prior art wireless communication system used with a kerosene-filled cable, or non-solid cable, includes a single coil that is attached with plastic "ties" to the bundles of wires which make up a center core of such a cable.

A possible solution to the problem of communication between a device external to a marine seismic cable and the cable was suggested in U.S. Pat. No. 5,923,616 to Badger et al. A system was suggested including a solid marine seismic cable assembly including communication coil housings which clamp around a cable in a spaced-apart relationship. Each housing contains at least two communication coils adapted for communicating with an adjacent external device. Two of the communication coils, whether or not adjacent to one another, are offset at least 90° from each other about the axis of the cable. Each external device has a unit which communicates with the communication coil via magnetic induction signals.

A major deficiency of this type of construction is that it requires the coils in each housing to be wired together. This increases the complexity of manufacture and compromises reliability in the system as a whole.

The coils of the communication system are offset at least 90° from each other so that, as the external device revolves around the housing, magnetic coupling is maintained. However, the single coil arrangement often results in low signal strength with poor coupling. Further, having only a single coil in communication at one time necessarily means that one coil is superfluous. Thus, there remains a need for a system which provides greater signal strength with all communication coils effectively employed. Such a system should provide for radial alignment, despite the movement of the cable and the external devices.

SUMMARY OF THE INVENTION

The present invention addresses these and other needs in the art by providing a communication housing, especially for level control devices, comprising an upper housing half and a lower housing half, coupled together around the cable. The upper housing half includes a plurality of wells, for example three wells, each adapted to receive a communication coil. The lower housing half has no such wells, and there is no interconnect wiring between the halves.

The communication coils are wound in series to reinforce the strength of the communication signal. Each of the individual communication coils is preferably formed in two segments, joined together at a flexible joint to reduce the likelihood of breakage of the coil core as the cable is subjected to bending under load as it is wound onto a takeup reel aboard the exploration vessel.

BRIEF DESCRIPTION OF THE DRAWINGS

These and other features of the invention will be apparent to those of skill in the art from a review of the following detailed description along with the accompanying drawings.

FIG. 3 is a perspective view of the communications housing of the present invention.

FIG. 4 is an end section view of the housing portions of the invention.

DETAILED DESCRIPTION OF A PREFERRED EMBODIMENT

Figure 1:
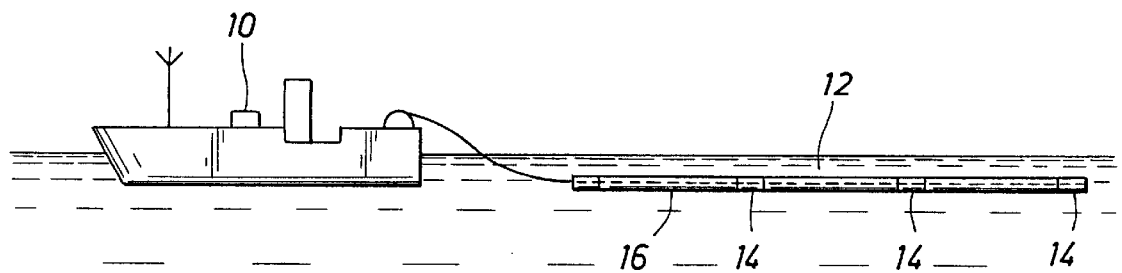
FIG. 1 is an overall schematic of a marine seismic system.
Figure 2:
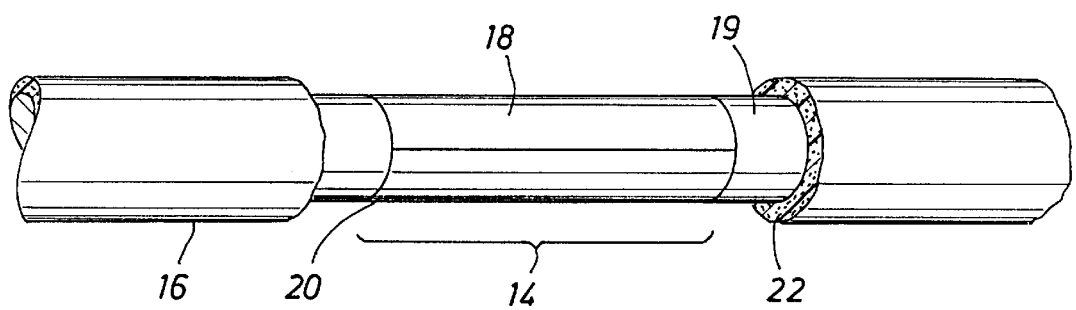
FIG. 2 is a partial cutaway view of a streamer cable showing the exterior of a communications housing of the invention.

FIG. 1 depicts a schematic of a basic marine seismic cable system including a vessel 10 towing a cable 12. The cable has a number of pieces of auxiliary equipment, such as depth control devices, associated with it that are not shown in order to simplify FIG. 1. The cable 12 also includes a number of spaced-apart locations 14 along the streamer where such level control devices (birds) are to be coupled to the cable. Communications housings 18 are placed at the spaced-apart locations 14, covered by a foam 22 and sealed with a jacket 16, preferably made of polyurethane, to present a smooth profile with an interior solid cable 19 to minimize flow noise. The cable is preferably a solid cable, with none of the fluid of well-known cables for providing buoyancy. It is in the communications housing 18 wherein the present invention resides.

FIGS. 3 and 4 depict a communications coil housing 30 of the present invention. The housing 30 comprises an upper housing half 32 and a lower housing half 34. The upper housing half 32 is provided with wells 36, such as for example three such wells 36 as shown in FIGS. 3 and 4. In contrast, no such wells are provided in the lower housing half 34. The upper and lower housing halves are firmly coupled together with screws or bolts 38 or other appropriate means around the interior solid cable 19, and are formed of a material which will not interfere with communication signals. The cable 16 and the housing 30 are co-axial along an axis 39.

Figure 5:
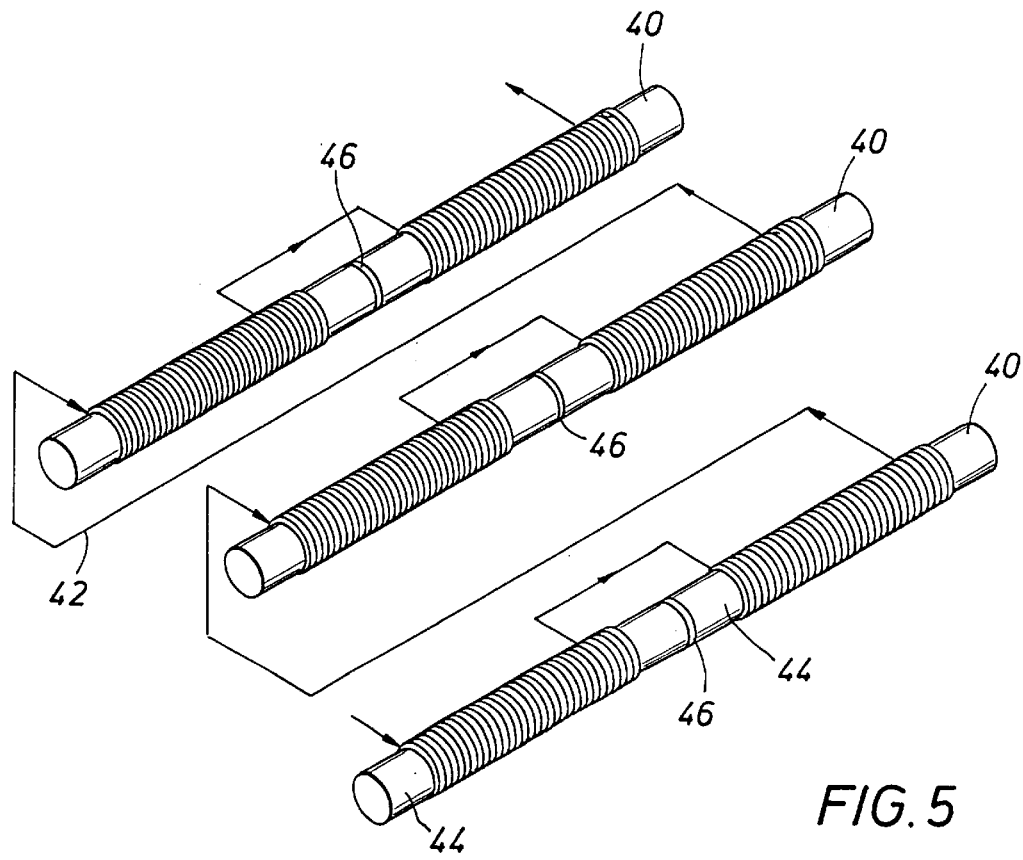
FIG. 5 is an electrical schematic diagram of the wiring of the communication coils of the invention.

Positioned in the wells 36 are communications coils 40 and as shown in FIGS. 3, 4, and 5 there are preferably three such coils 40. The coils 40 are wound in such a manner as to reinforce the signal strength of the communication signal that they carry. The coils 40 are preferably potted into the wells 36 with a magnetically transparent potting material. Further, the wells, and therefore the coils, are positioned at 44° between adjacent coils, or no more than 88° between the outside coils.

FIG. 5 shows how the communication coils 40 are wired together with signal wire 42. The three communication coils 40 are each comprised of a pair of coil segments 44, wire together in series. In between the pair of coil segments 44 is a flexible joint 46, such as for example a soft rubber joint. The flexible joint has been found desirable because the cores of the segments 44 are somewhat brittle, in order to provide adequate magnetic permeability. For example, the core of the coil is typically made of a ferrite rod, which is wound with insulated copper wire to form the communication coil. The flexible joints 46 reduce the likelihood of the communication coils 40 breaking when the cable is reeled onto the cable reel aboard the vessel.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

We claim:

1. A marine seismic cable assembly comprising:
   a. a cable having an axis; and
   b. a communication coil housing which clamps around the cable, the housing containing a plurality of communication coils adapted for communicating with an external device, wherein any two adjacent communication coils, are radially offset from each other by no more than about 44° from each other.

2. The assembly of claim 1, wherein the housing comprises an upper housing half and a lower housing half, and wherein the communication coils are contained within the upper housing half, and wherein the lower housing half contains no communication coils, and wherein there is no interconnect wiring between the halves.

3. The assembly of claim 2, further comprising a plurality of wells formed in the upper housing, and wherein each of the plurality of communication coils is mounted in its respective well.

4. The assembly of claim 3, further comprising a magnetically permeable potting material sealing each of the plurality of communication coils in its respective well.

5. The assembly of claim 1, wherein each of the plurality of communication coils comprises a pair of coil segments and a flexible joint between the coil segments.

6. The assembly of claim 5, wherein the segments are coupled together electrically in series.

* * * * *